Figure 8:
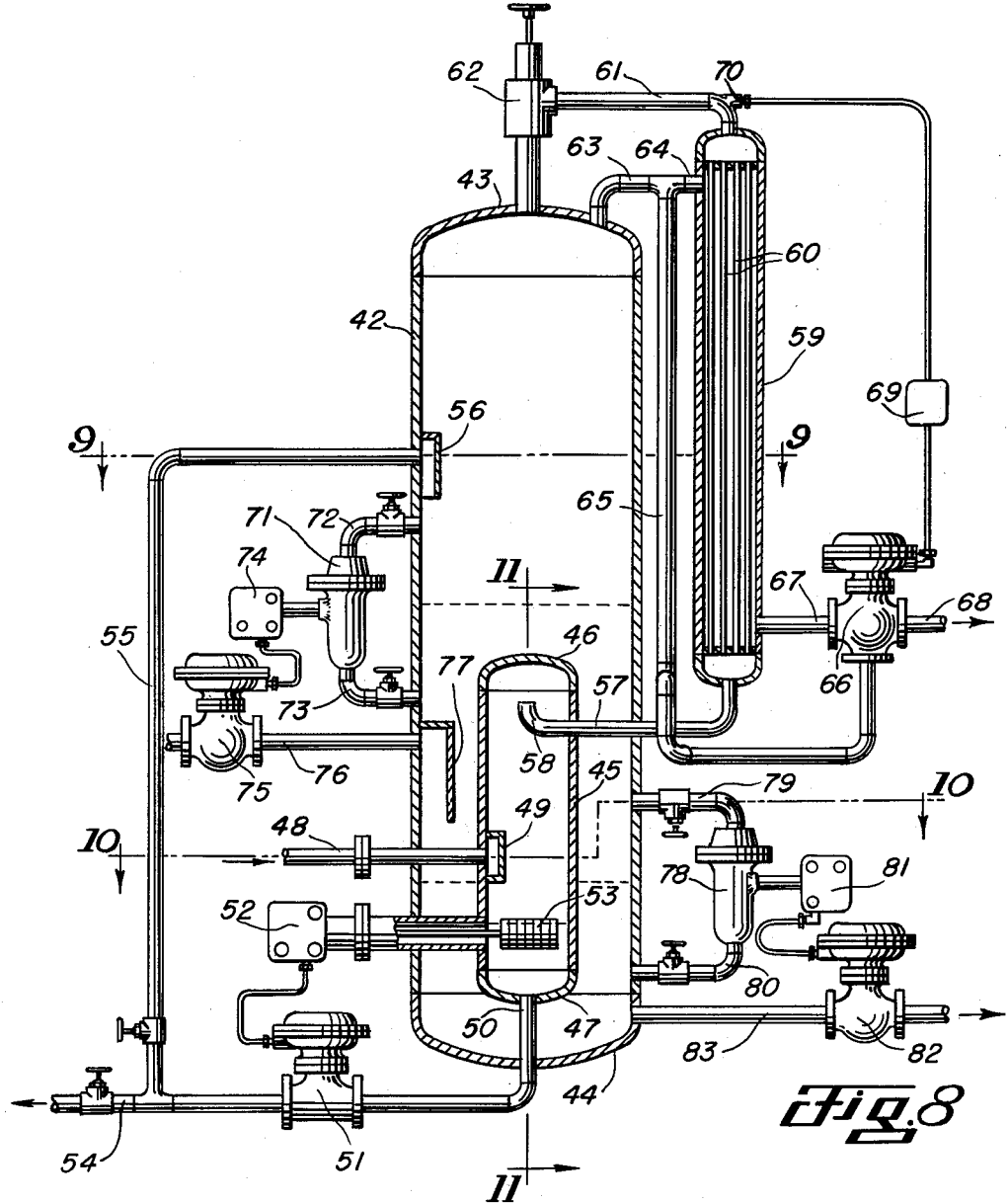

March 27, 1956 — C. O. GLASGOW — 2,739,460
LOW TEMPERATURE GAS SEPARATOR
Filed Jan. 28, 1952 — 4 Sheets-Sheet 1
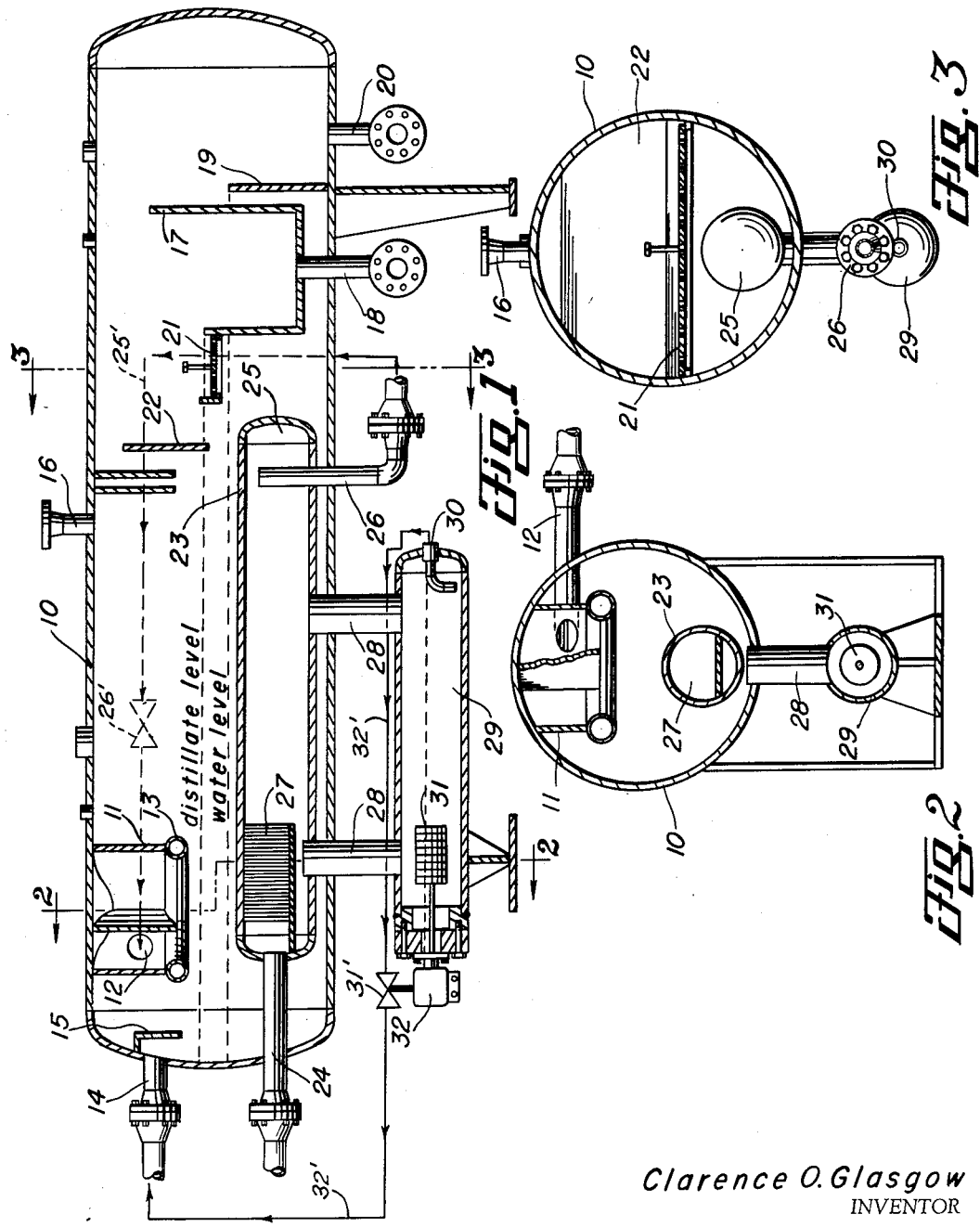
Clarence O. Glasgow
INVENTOR
BY Ashley & Ashley
ATTORNEYS

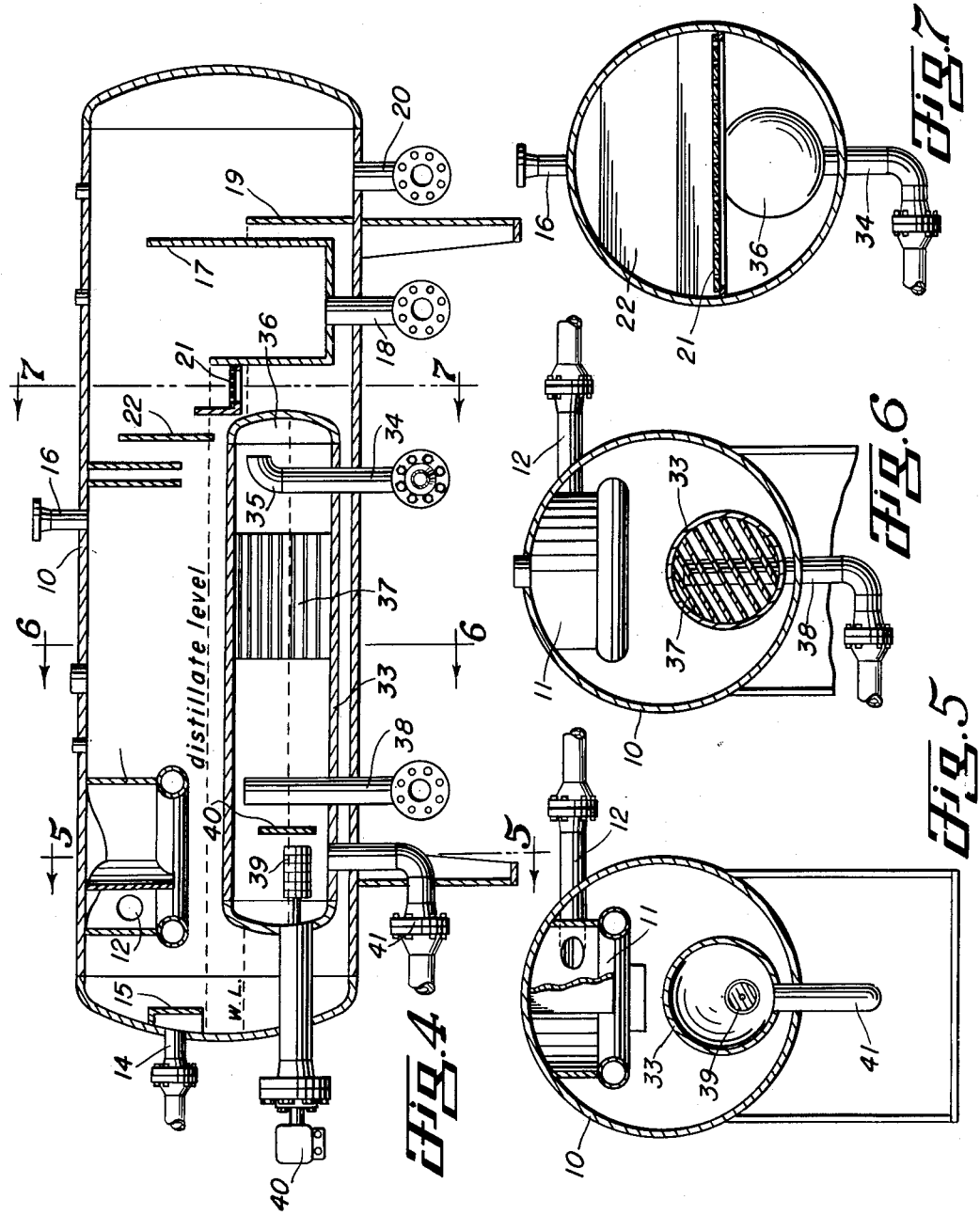

March 27, 1956

C. O. GLASGOW 2,739,460

LOW TEMPERATURE GAS SEPARATOR

Filed Jan. 28, 1952

4 Sheets-Sheet 3

Clarence O. Glasgow
INVENTOR

BY Ashley & Ashley

ATTORNEYS

March 27, 1956 C. O. GLASGOW 2,739,460
LOW TEMPERATURE GAS SEPARATOR
Filed Jan. 28, 1952 4 Sheets-Sheet 4

Clarence O. Glasgow
INVENTOR

BY Ashley & Ashley
ATTORNEYS

United States Patent Office 2,739,460
Patented Mar. 27, 1956

2,739,460
LOW TEMPERATURE GAS SEPARATOR

Clarence O. Glasgow, Tulsa, Okla., assignor to National Tank Company, Tulsa, Okla., a corporation of Nevada Application January 28, 1952, Serial No. 268,616

8 Claims. (Cl. 62—122)

This invention relates to new and useful improvements in methods and means for low temperature separation.

Certain of the structures and structural components illustrated in this application and certain of the methods herein contained are disclosed in the co-pending applications of Walker et al., Serial No. 185,608, filed September 19, 1950, now abandoned, De Young et al., Serial No. 244,406, filed August 30, 1951, Patent No. 2,711,826, dated June 28, 1955, and Glasgow et al., Serial No. 249,184, filed October 1, 1951, now abandoned. Reference is made to these co-pending applications. Certain of the structures herein shown and not claimed are claimed in the above applications.

In the low temperature separation field, it has long been the practice to pass the high pressure gas stream initially through a high pressure separator or water knockout of some suitable type in order to remove from the gas stream any components which may then be present as liquids. A considerable quantity of the water present in the gas stream is thus removed in this step, and the problems arising later in the system due to the presence of water are thus somewhat reduced and the handling of the water is facilitated. Cooling before or during this initial separation step is desirable in order that the optimum quantity of liquids may be removed at this point, and this step also is contemplated by the present invention.

After the gas stream has undergone the preliminary separation step, it is customarily reduced in pressure, as by passage through a choke or other pressure reducing device, in order to chill and thoroughly cool the gas stream so that valuable hydrocarbons are condensed therefrom. In this expansion step, the gas stream normally is reduced to a temperature below that at which gas hydrates form, and unless other provision has been made for controlling the gas hydrates, it is customary to provide suitable heating means therefor. In the co-pending applications to which reference has been made hereinabove, the system thus includes a low temperature separation vessel into which the reduced pressure gas stream is directed and in which there is provided suitable heating means for maintaining the body of separated liquids collected within the vessel at the desired temperature level. One function of this heating means may be to melt the gas hydrates which are formed in order to prevent the excessive accumulation of such hydrates in the low temperature vessel.

It is also customary to introduce into the gas stream before or after the initial separation step a suitable dehydrating or inhibiting material, such as the glycols, salt solutions, and the like, in order to dehydrate and more or less desiccate the gas stream before it undergoes pressure reduction and reaches its lowest temperature. This process of removing the water present in the gas stream minimizes or eliminates the formation of gas hydrates so that there may be little if any need for supplying heat to the low temperature separation vessel solely for this purpose.

On the other hand, however, it may be, and normally is, desirable to supply heating means for the low temperature vessel in order to stabilize the liquids separated and recovered therein. These vessels often operate at temperatures near or below 0° Fahrenheit, and at these temperatures, the recovered liquids may contain excessive quantities of the more volatile hydrocarbons. Hence, before the liquids are passed to storage tanks, it is desirable that they be at least partially stabilized by removal of the very light hydrocarbons. The utilization of heating means in the low temperature vessel achieves this desirable result.

The present invention is concerned primarily with a novel combination of the initial, high-pressure separation step and the subsequent, reduced pressure, low temperature separation step. The invention results in a considerable reduction of the quantity of equipment required and obtains the desired results by passing the gas stream through a lesser number of steps than heretofore required.

It is therefore the principal object of this invention to provide an improved low temperature separation unit wherein the high pressure separator and the low temperature separator are arranged in combination and in heat exchanging relationship, the high pressure separator providing the heating means for the low temperature separator, and the latter providing the cooling means for the high pressure separator.

A further important object of the invention is to provide an improved method for carrying out low temperature separation of hydrocarbon streams wherein the gas stream is passed through a high pressure separator and simultaneously in heat exchange relationship with the fluids separated in a low temperature separator, thus resulting in the cooling of the fluid stream in the high pressure separator and the warming of the liquids separated in the low temperature separator.

A further object of the invention is to provide an improved method and means of low temperature separation which may be applied to both vertical and horizontal low temperature separation vessels.

Other and more specific objects of the invention will be apparent from a reading of this specification and the claims appended thereto.

A construction designed to carry out the invention will be hereinafter described together with other features of the invention.

Figure 10:
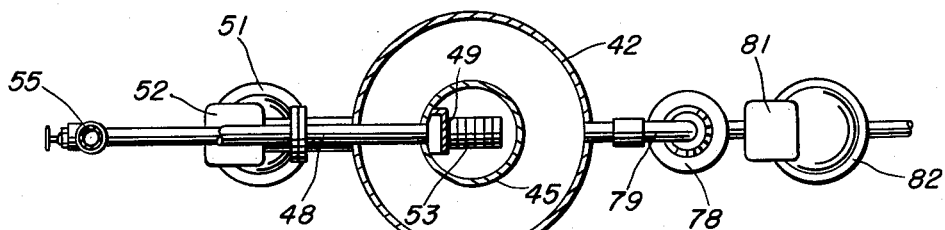
Figure 9:
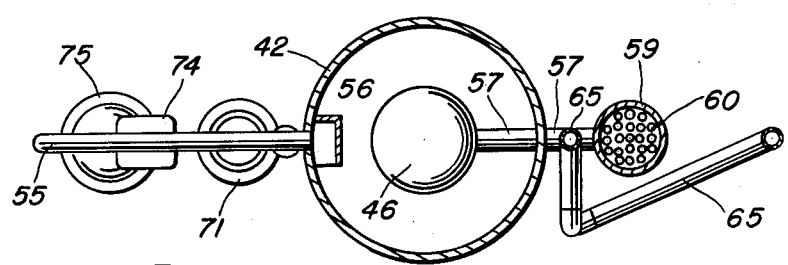
Figure 11:
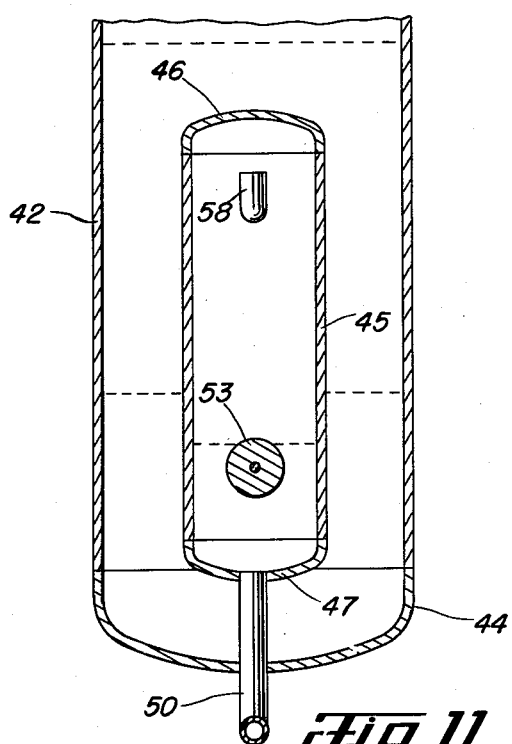

The invention will be more readily understood from a reading of the following specification and by reference to the accompanying drawings, wherein an example of the invention is shown, and wherein:

Fig. 1 is a vertical, longitudinal, sectional view of a low temperature separation unit constructed in accordance with this invention and adapted to carry out the methods thereof, Fig. 2 is a vertical, transverse, sectional view taken upon the line 2—2 of Fig. 1, Fig. 3 is a vertical, transverse, sectional view taken upon the line 3—3 of Fig. 1, Fig. 4 is a vertical, longitudinal, sectional view of a modified form of the invention, Figs. 5, 6 and 7 are vertical, transverse, sectional views taken upon the respective lines of Fig. 4, Fig. 8 is a vertical, transverse, sectional view showing a further modification of the invention, Figs. 9 and 10 are horizontal, transverse, sectional views taken upon the respective lines of Fig. 8, and Fig. 11 is a vertical, sectional view taken upon the line 11—11 of Fig. 8.

In the drawings, the numeral 10 designates an elongate, horizontal, low temperature separation vessel of the general type shown in the co-pending application of Walker et al., Serial No. 185,608, filed September 19, 1950. Near its inlet end, the vessel is provided with a spinner drum 11 having a tangential fluid stream inlet 12 and being provided with a heating coil 13. The drum 11 is mounted in the upper portion of the vessel 10 whereby separated liquids may accumulate in the lower portion of the vessel and be spaced from said drum.

The vessel 10 is also provided with a fluid stream inlet 14 extending through the end wall of the vessel adjacent the drum 11 for conducting and admitting a predominantly liquid stream to the interior the vessel. As suitable diverter plate 15 overlies the inlet end of the member 14 so as to direct fluids flowing therefrom toward the lower portion of the vessel 10. A suitable gas outlet fitting 16 is provided in the upper portion of the vessel 10, and a weir box structure 17 in the end of the vessel 10 opposite from the inlet end makes provision for skimming off separated hydrocarbons so that the same may be withdrawn through a distillate outlet pipe 18. Separated water passes under the weir box 17 and over a plate 19 to be removed through a water outlet pipe 20. The hydrate excluding structure 21 of co-pending application Serial No. 244,406 may, if desired, be associated with the weir box 17, and the gas baffle structure 22 of co-pending application Serial No. 249,184 may be positioned between the liquid outlet zone of the vessel 10 and the gas outlet fitting 16.

The structure thus far described is disclosed in one or more of the co-pending applications hereinbefore enumerated, and the operation of said structure is also set forth at length in said applications. In brief, the gas stream flowing from the well is passed through the coil 13 for supplying heat to the same and is then directed into a high pressure separator or water knockout to be described hereinafter. The liquids and gas separated in the high pressure separator are conducted separately or together through a suitable choke, or any other suitable pressure reducing device, and enter the vessel 10 through the inlet pipe 12. It is usually desirable that the liquids separated in the high pressure knockout be separately conducted to the vessel 10 and admitted thereto through the inlet conductor 14, but this step is not essential to the present invention.

Within the vessel 10, the gas stream, having been thoroughly cooled by the pressure reduction step, separates into gas and liquid strata, and gas hydrates and/or ice particles, which may have been formed in the pressure reducing step, fall with the liquids into the lower portion of the vessel. The gas is withdrawn through the fitting 16, and the liquids stratify in the lower portion of the vessel, the distillate being drawn off through the pipe 18 and the water being drawn off through the pipe 20. Heating means, to be described hereinafter, are provided in the lower portion of the vessel 10 and function to melt any hydrates which may be present, and further to stabilize the separated hydrocarbons which may be at a very low temperature.

As pointed out hereinabove, it is desirable in a system of this type to provide for cooling of the gas stream followed by a separation at high pressure of the liquids which may be present therein. It is further desirable to provide heating means for the vessel 10 whether or not hydrates are present, and this invention is concerned primarily with the achieving of all of these desirable results through a simple combination structure.

Within the lower portion of the vessel 10, there is mounted a high pressure separating vessel or water knockout 23. The vessel 23 is elongate and horizontal, and is immersed completely in the body of liquid which accumulates within the lower portion of the vessel 10. As noted above, the liquids separated in the vessel 10 stratify into hydrocarbon and water layers, and it is desirable, but not essential, that the high pressure separator vessel 23 be disposed entirely within the water stratum so that excessive heating of the hydrocarbon stratum is avoided.

The vessel 23 is provided with an inlet pipe 24 extending through one end wall thereof and also through the end wall of the vessel 10. The opposite end 25 of the vessel 23 is disposed adjacent the weir box 17 and is closed. A gas outlet pipe 26 extends through the bottom of the vessel 10 and through the bottom of the vessel 23 to a point within the vessel 23 and adjacent the upper wall thereof. The gaseous portion of the well stream entering the vessel 23 is thus removed through the outlet pipe 26. This gas may be conducted through the pipe indicated at 25' directly to the choke (shown in dotted lines at 26' in Fig. 1) and thence to the gas inlet pipe 12, or it may be passed through a suitable heat exchanger (not shown) and conducted in heat exchange relationship with the cold gas leaving through the outlet fitting 16. In the latter case, the gas stream would receive additional cooling before undergoing pressure reduction and final cooling to the desired operating temperature.

The well stream entering through the pipe 24 may and usually does contain large and small particles or globules of liquid which may be composed of water or water and hydrocarbons. A suitable mist extractor 27 is positioned within the vessel 23 and overlies the fluid inlet thereto so as to remove from the influent stream the larger liquid particles which may be present therein. This liquid of course drains immediately to the lower portion of the vessel 23, while the remaining liquid particles present in the gas stream will settle to the lower portion of the vessel 23 as the gas stream is conducted in an elongate horizontal flow path therethrough to the gas outlet 26.

The vessel 23 is provided with a pair of liquid drain pipes 28 which extend from the lower wall thereof, through the lower wall of the vessel 10 to a liquid accumulating vessel or tank 29 mounted exteriorly of and under the vessel 10. The vessel 29 is provided with a suitable drain outlet 30 and a level controlling float 31 operating suitable control mechanism 32 which, in turn, operates a drain valve 31' through which liquid drains from the outlet 30. As pointed out hereinabove, the separated liquids may be introduced to the vessel 10 through the inlet fitting 14 via the conductor indicated at 32' in Fig. 1 and extending through the drain valve 31'.

The vessel 23 and the vessel 29, with their associated conductors and fittings, constitute a horizontal separator. Although a specific type of horizontal separator has been illustrated, it is to be noted that any suitable type of separating structure may be employed. Since the vessel 10 is horizontal and the thickness of the liquid strata in the lower portion thereof are of restricted dimensions, it is desirable that the high pressure separator or water knockout be of the horizontal type. It is obvious, however, that any suitable type of separator may be employed and that the essence of the invention is the positioning or placing of said separator within the lower portion of the vessel 10.

This combining of the low temperature separation vessel 10 and the high pressure separator 23 provides an improved and combination result which is not obtained if separate and distinct vessels are employed in their stead. The flow stream entering through the pipe 24 is cooled in its passage through the high pressure separator structure, and hence, increased quantities of liquids are separated therein. At the same time, this well stream functions as a heating medium for supplying heat to the lower portion of the vessel 10, resulting in the melting of hydrates which may be present, and in the supplying of stabilizing heat to the separated hydrocarbons.

Although the particular structure shown in Fig. 1 possesses certain advantages in that the float structure is positioned exteriorly of the vessel 10 and is readily accessible for repair and the like, a single vessel type of high pressure separator may be employed as shown in Fig. 4. In this modification, the high pressure separator comprises a single, elongate horizontal vessel 33 mounted in the lower portion of the vessel 10 and provided with a well stream inlet pipe 34 which extends upwardly through the bottom of the vessel 10 and the bottom of the vessel 33 into the upper portion of the latter. The inlet pipe 34 is desirably provided with an elbow 35 upon its upper end so as to direct the well stream toward the closed end 36 of the vessel 33 adjacent the weir box 17.

Intermediate its ends, the vessel 33 is provided with a plurality of gravity separation plates 37, and in passing between these longitudinally disposed plates, the liquid particles separate and settle from the gas stream and are collected on the plates so as to drain to the lower portion of the vessel 33. Gas is withdrawn from the vessel 33 through a gas outlet pipe 38 extending from the upper interior portion of the vessel through the bottom thereof and through the bottom wall of the vessel 10. A liquid control float 39 operates a control mechanism 40 for regulating the withdrawal of liquid from the vessel 33, the float 39 being disposed within the vessel 33 and adjacent the end thereof opposite the end 36, and being protected from turbulence within the vessel 33 by a transverse baffle 40. Separated liquid may be removed from the high pressure separator 33 by a suitable outlet fitting 41, and the separated liquid and gas streams are subsequently handled as described hereinbefore in connection with the form of the invention shown in Fig. 1.

Here again, the influent well stream is cooled as it undergoes initial separation, and the high pressure separator or water knockout is employed for supplying heat to the lower portion of the low temperature separation vessel 10. It is to be noted that the flow stream entering through the pipe 34 will be the warmest portion of the flow stream and that it is directed upon the head 36 which is disposed closely adjacent the hydrate straining or excluding structure 21. Hence, the maximum amount of heat will be supplied at this point to the hydrocarbons separated within the vessel 10, and hence, the possibility of hydrates escaping into the weir box 17 without melting is substantially eliminated.

In Fig. 8, there is shown a further modification of the invention, and in this figure, a complete low temperature separation system is illustrated. Here again, the same principles are applied of utilizing the preliminary high pressure separator or water knockout as heating means for the low temperature separation vessel, and the same benefits flow from this combination. The modification illustrates the invention as applied to a vertical vessel with a vertical high pressure separator therein, but the general principles of operation remain the same.

In this modification, the numeral 42 designates an elongate vertical or upright vessel having an upper dished head 43 and a lower dished bottom 44. Any suitable type of support for the vessel may be provided. A somewhat smaller high pressure separating vessel 45 is disposed within the lower portion of the vessel 42 and has its side walls spaced from the inner wall of the vessel 42 so that the vessel 45 will be immersed and its side walls contacted by liquid accumulating within the lower portion of the vessel 42. The vessel 45 has a closed upper end or head 46 and a dished bottom 47.

The well stream is introduced through an inlet pipe 48 which extends through the side wall of the vessel 42 into the vessel 45. A suitable diverter box 49 overlies the inner end of the conductor 48 and causes the well stream to assume a circumferential path upon the inner wall of the separator vessel 45 whereby a scrubbing and separating action is obtained and any liquid which may be present within the well stream is efficiently separated from the gaseous portion thereof. Since the lower portion of the low temperature vessel 42 will normally be filled with a relatively cold liquid, it is apparent that the well stream in its passage to and through the separator vessel 45 will be cooled and some condensation of liquids from the well stream may occur. These condensed liquids along with other liquids separated from the well stream are removed from the vessel 45 through a liquid drain pipe 50 extending from the bottom end 47 of the vessel 45 through the bottom 44 of the vessel 42. A diaphragm operated valve 51 is connected into the outlet pipe 50 and is actuated by a suitable control mechanism 52 connected to a float 53 disposed within the lower portion of the vessel 45. The separated liquids may be drawn off through a branch pipe 54 connected to the pipe 50, or, more desirably are conducted from the pipe 50 through a branch pipe 55 to the upper portion of the vessel 42. A deflector box 56 overlies the entrance point of the pipe 55 through the side wall of the vessel 42 and serves to direct the separated liquids downwardly within the low temperature vessel. The gas separated in the high pressure separator 45 is removed through a gas outlet pipe 57 which extends through the side walls of the vessel 45 and the vessel 42 and is provided upon its inner end with an upturned elbow 58 directed toward the upper head 46 of the vessel 45. Thus, gas is removed only from the uppermost portion of the vessel 45 and the likelihood of liquids being removed in this gas stream is minimized. The gas outlet pipe 57 is connected into the lower end of a tube and shell heat exchanger 59 and passes through the tube bundle 60 of said exchanger to the upper end thereof. From the upper end of the heat exchanger, the gas stream is conducted through a pipe 61 to a suitable choke 62, which preferably is adjustable, and thence through the head 43 into the upper portion of the vessel 42.

The gas stream is cooled in the exchanger 59, preferably to a temperature only a few degrees above the hydrate expectancy point of the gas stream, and, of course, as the gas is expanded through the choke 62 and enters the vessel 42, very low temperatures are obtained. Normally, these vessels operate at a temperature of around 0° Fahrenheit or a few degrees therebelow, but temperatures as high as 40° to 50° Fahrenheit and as low as can be obtained by the permissible expansion, can also be employed to advantage. As the gas stream expands and is cooled by the Joule-Thompson effect, gas hydrates may form, but, by reason of the low temperatures obtained, liquefaction and separation of considerable quantities of hydrocarbons is assured. The liquids and any gas hydrates and/or ice particles which may form, settle to the lower portion of the vessel 42, while the gas is drawn off through a gas outlet pipe 63 connected into the head 43.

The gas outlet pipe 63 is branched, one branch 64 being connected into the shell side of the heat exchanger 59, while the other branch 65 leads to one of the inlet ports of a three-way valve 66. There is a gas outlet pipe 67 connected between the opposite end of the heat exchanger and the other inlet opening of the valve 66. Further, a gas exhaust pipe 68 leads from the outlet port of the valve 66 and may be connected to a gas transmission line, compressor, or other point of use of the residual gas.

The valve 66 is preferably diaphragm operated and is actuated through a suitable temperature controller 69 having its temperature sensing connection 70 leading to the pipe 61. With this arrangement, the flow of cold gas from the low temperature separator 42 through the heat exchanger 59, and the bypassing of such gas around the heat exchanger through the pipe 65 may be controlled and regulated so as to cool the inlet gas flowing from the pipe 57 through the heat exchanger to the pipe 61 to the desired degree. It is desirable that this gas not be cooled below its hydrate expectancy point since this might result in the formation of gas hydrates within the heat exchanger or the pipe 61 and cause stoppage or impeding of the gas flow. The temperature controller 69, sensing the temperature of the gas stream in pipe 61 by the element 70, permits only a sufficient quantity of flow of cold gas through the heat exchanger to cool the incoming gas stream to the desired point. Depending upon the condition at hand and the temperatures of the several gas streams as well as the composition thereof, greater or lesser quantities of the outlet gas may be passed through the heat exchanger or the bypass pipe 65.

The liquids, including water and hydrocarbons, as well as any gas hydrates or ice which may be formed, fall to the lower portion of the vessel 42 and stratify therein in water and hydrocarbon layers. The high pressure separator vessel 45, which is maintained relatively warm by the well stream passing therethrough, is completely immersed in these liquid layers and supplies the desired quantity of heat thereto. As pointed out hereinbefore, this heating function results in the melting of any hydrates which may be present and provides desirable stabilization of the recovered hydrocarbons. At the same time, the cold separated liquids, by extracting heat from the vessel 45, function to cool the well stream passing therethrough. For drawing off the separated hydrocarbons, a float chamber 71 has its upper and lower ends connected to the interior of the vessel 42 by pipes numbered 72 and 73, respectively. The float chamber 71 is approximately horizontally alined with the hydrocarbon liquid level which it is desired to maintain in the vessel 42, and a float (not shown) contained within the chamber 71 actuates a control mechanism 74, which, in turn, controls a diaphragm operated valve 75. The valve 75 is connected into a liquid hydrocarbon discharge line 76 which leads through the side wall of the vessel 42 from a point spaced below the hydrocarbon liquid level. Desirably, the inlet end of the pipe 76 is protected by an open-bottom box 77 which protects the inlet from water or hydrates settling within the vessel 42 and insures the removal of liquid hydrocarbons only through said outlet pipe.

At the lower end of the vessel 42, there is provided a second float chamber 78 connected at its upper and lower ends to the interior of the vessel 42 by pipes 79 and 80. The float (not shown) of this float chamber actuates a control mechanism 81, similar to the mechanism 74, and this control member in turn operates a diaphragm actuated water drain valve 82. The pipe 82 is connected into a water drain pipe 83 leading from the bottom of the vessel 42.

The operation of this last modification is substantially the same as that of the previous modifications, and like the latter, is subject to considerable variation. The important features of the invention are the high pressure knockout or water separator through which the well stream is passed as a preliminary step, the low temperature separation vessel and the combining of the components into a single structure whereby each may benefit in the operation of the other and whereby results are obtained from the combined structure which are not obtained when the components are separated one from another.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a low temperature separation unit, the combination of a low temperature separation vessel having a gas zone and a separated-liquids accumulation zone, a preliminary separator in the accumulation zone, a well fluid inlet to the preliminary separator within the accumulation zone, a well fluid outlet from the preliminary separator, a well fluid inlet to the low temperature separation vessel, means for conducting a well fluid from the well fluid outlet to the well fluid inlet of the low temperature separation vessel, means for effecting cooling of the well fluid in its passage from the preliminary separator to the low temperature separation vessel, means for drawing off gas from the latter vessel, and means for drawing off liquids from the latter vessel.

2. The combination as set forth in claim 1, wherein the low temperature separation vessel is provided with means for maintaining a liquid level therein, and the preliminary separator is disposed below said liquid level.

3. The combination as set forth in claim 1, wherein the preliminary separator includes a liquid accumulation chamber disposed exteriorly of the low temperature separation vessel.

4. The combination as set forth in claim 1, wherein the preliminary separation includes a well liquid outlet, and means for conducting well liquids from the preliminary separator to the low temperature separation vessel apart from the means for conducting a well fluid to the latter vessel.

5. In a low temperature separation unit, the combination of a low temperature separation vessel having a well fluid inlet, a gas zone, an outlet from the gas zone, a separated-liquids accumulation zone, a partition in the vessel defining one boundary of the accumulation zone and over which separated liquids spill, and a liquid outlet from the vessel; of a preliminary separator having a liquid and gas separation enclosure, the enclosure being disposed within the accumulation zone of the low temperature vessel with one wall adjacent the partition in said vessel, a well fluid inlet to the enclosure within said accumulation zone and from which well fluid is passed over said wall so as to supply heat thereto from the well fluid, a well fluid outlet from the enclosure, means for conducting well fluid from the latter outlet to the low temperature vessel inlet, and means for effecting the cooling of the well fluid in its passage from the preliminary separator to the low temperature vessel.

6. The combination as set forth in claim 5, wherein the preliminary separator includes a separated-liquid receiving enclosure positioned exteriorly of the low temperature vessel; and a liquid outlet from the latter enclosure.

7. In a low temperature separation unit, the combination of a horizontal low temperature separation vessel, a well fluid inlet to the vessel, means for maintaining a body of liquid in the vessel so as to divide the vessel into a gas zone and a separated-liquids accumulating zone, a gas outlet from the vessel, a liquid outlet from the vessel, a horizontal separator having a liquid and gas separating space and a separated-liquid receiving space, at least the portion of the horizontal separator containing the separating space being disposed in the accumulating zone of the low temperature vessel, a well fluid inlet to the separating space of the horizontal separator, a well fluid outlet from the horizontal separator, means for conducting well fluid from the latter outlet to the well fluid inlet of the low temperature vessel, and means for effecting the cooling of the well fluid in its passage from the horizontal separator to the low temperature vessel.

8. In a low temperature separation unit, the combination of a low temperature separation vessel having a gas zone and a separated-liquids accumulation zone, a preliminary separator, a well fluid inlet to the preliminary separator, a well fluid outlet from the preliminary separator, a well fluid inlet to the low temperature separation vessel, means for conducting a well fluid from the well fluid outlet to the well fluid inlet of the low temperature separation vessel, means for effecting cooling of the well fluid in its passage from the preliminary separator to the low temperature separation vessel, means for drawing off gas from the latter vessel, and means for drawing off liquids from the latter vessel, the preliminary separator and the accumulation zone and the well fluid inlet to the preliminary separator being arranged in close thermal relationship.

References Cited in the file of this patent

UNITED STATES PATENTS

| | | |
|---|---|---|
| 1,959,884 | Van Nuys | May 22, 1934 |
| 2,151,248 | Vaughan | Mar. 21, 1939 |

(Other references on following page)

| | | | | | |
|---|---|---|---|---|---|
| 2,156,234 | Bays | Apr. 25, 1939 | 2,528,028 | Barry | Oct. 31, 1950 |
| 2,179,131 | Millard | Nov. 7, 1939 | 2,557,171 | Bodle | June 19, 1951 |
| 2,198,142 | Wade | Apr. 23, 1940 | 2,603,956 | Borchardt | July 22, 1952 |
| 2,245,028 | Farris | June 10, 1941 | 2,665,565 | Parks | Jan. 12, 1954 |
| 2,284,737 | Hirshstein | June 2, 1942 | 2,671,322 | Barry | Mar. 9, 1954 |
| 2,349,944 | Dixon | May 30, 1944 | 2,683,972 | Atkinson | July 20, 1954 |
| 2,500,136 | Orgorzaly | Mar. 7, 1950 | | | |